(12) United States Patent
Kochi et al.

(10) Patent No.: US 9,724,609 B2
(45) Date of Patent: Aug. 8, 2017

(54) APPARATUS AND METHOD FOR AUGMENTED REALITY

(71) Applicant: Sony Computer Entertainment Europe Limited, London (GB)

(72) Inventors: Masami Kochi, London (GB); Russell Harding, London (GB); Diarmid Archibald Campbell, London (GB); David Ranyard, London (GB); Ian Michael Hocking, London (GB)

(73) Assignee: Sony Computer Entertainment Europe Limited (GB)

( * ) Notice: Subject to any disclaimer, the term of this patent is extended or adjusted under 35 U.S.C. 154(b) by 524 days.

(21) Appl. No.: 13/888,559

(22) Filed: May 7, 2013

(65) Prior Publication Data

US 2013/0303285 A1    Nov. 14, 2013

(30) Foreign Application Priority Data

May 11, 2012   (GB) .................................. 1208278.0

(51) Int. Cl.
| | | |
|---|---|---|
| *A63F 9/24* | (2006.01) | |
| *A63F 13/56* | (2014.01) | |
| *G06T 19/00* | (2011.01) | |
| *A63F 13/00* | (2014.01) | |
| *A63F 13/573* | (2014.01) | |

(52) U.S. Cl.
CPC .............. *A63F 13/56* (2014.09); *A63F 13/00* (2013.01); *G06T 19/006* (2013.01); *A63F 13/573* (2014.09)

(58) Field of Classification Search
CPC ... G06T 19/006; G06T 19/20; G06T 2200/04; G06T 2200/205
USPC ................... 348/135, 164; 345/633
See application file for complete search history.

(56) References Cited

U.S. PATENT DOCUMENTS

| | | | | |
|---|---|---|---|---|
| 2010/0208057 | A1* | 8/2010 | Meier ................. | G06T 7/0046 348/135 |
| 2011/0090343 | A1* | 4/2011 | Alt ..................... | G06T 7/0044 348/164 |
| 2012/0069051 | A1* | 3/2012 | Hagbi .................. | G06T 19/006 345/633 |

FOREIGN PATENT DOCUMENTS

EP    2426641 A1    3/2012

OTHER PUBLICATIONS

Search Report dated Sep. 11, 2012 for Application No. GB1208278.0.

* cited by examiner

*Primary Examiner* — Omkar Deodhar
*Assistant Examiner* — Eric M Thomas
(74) *Attorney, Agent, or Firm* — Lerner, David, Littenberg, Krumholz & Mentlik, LLP (57) ABSTRACT

A method of incorporating an augmented reality video image into a virtual environment comprises detecting a state of a real-world control object captured in a video image and augmenting the video image responsive to the state of the control object. The method further includes calculating trajectory parameters for an action with respect to a local coordinate system of the video image, responsive to the state of the control object, and embedding the augmented video image within a 3D virtual environment. The method also includes calculating the trajectory parameters for the action with respect to a local co-ordinate system of the 3D virtual environment, and rendering a graphical effect corresponding to the action within the 3D virtual environment.

15 Claims, 6 Drawing Sheets

APPARATUS AND METHOD FOR AUGMENTED REALITY

CROSS REFERENCE TO RELATED APPLICATIONS

The present application claims the benefit of and priority to GB Application No. 1208278.0, filed May 11, 2012, the entire disclosure of which is incorporated by reference herein.

BACKGROUND OF THE INVENTION

Field of the Invention

The present invention relates to an apparatus and method for augmented reality.

Description of the Prior Art

Recent advances in the capabilities of videogame consoles such as the Sony® Playstation 3® console (PS3®) and other personal computers, coupled with the ubiquity of peripheral devices such as webcams and other cameras such as the Sony EyeToy® and PlayStation Eye®, have popularised the use of augmented reality.

Augmented reality, also known as mixed reality, takes a live video input and superposes computer graphics over it to enable a user to interact with an application (typically a game) though hand gesture, facial expression and/or body movement, rather than or in addition to more conventional inputs such as a mouse, keyboard or joypad.

For example, a virtual augmentation of a captured video image may comprise an augmentation image layer, comprising in turn one or more virtual entities. This layer is superposed on the captured video image, thereby combining real and virtual features. In addition, the virtual augmentation may comprise input regions on the augmented image, allowing a user to interact with the image. Typically these inputs are correlated with all or part of one or more virtual entities, but can be correlated with an element of the captured video image, for example using object recognition.

An example of such augmented reality is the well-known EyePet® game, where a user interacts with a virtual pet by stroking it, or controlling virtual objects using a so-called fiduciary marker (a hand-held card with a high contrast pattern) or a Playstation Move® controller, which the PS3 can track using the EyeToy, and replace with a further virtual object on-screen. See for example http://www.youtube.com/watch?v=ORYSSQZTzbE.

However, it is desirable to improve further upon this interaction with virtual entities.

SUMMARY OF THE INVENTION

In a first aspect, a method of incorporating an augmented reality video image into a virtual environment is provided in accordance with claim 1.

In another aspect, an entertainment device is provided in accordance with claim 11.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

An apparatus and method for augmented reality are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

As noted above, the Sony PS3 console is a suitable apparatus or entertainment device for implementing augmented reality, typically when connected to a suitable video camera such as the EyeToy, and when operating under suitable software control.

Figure 1:
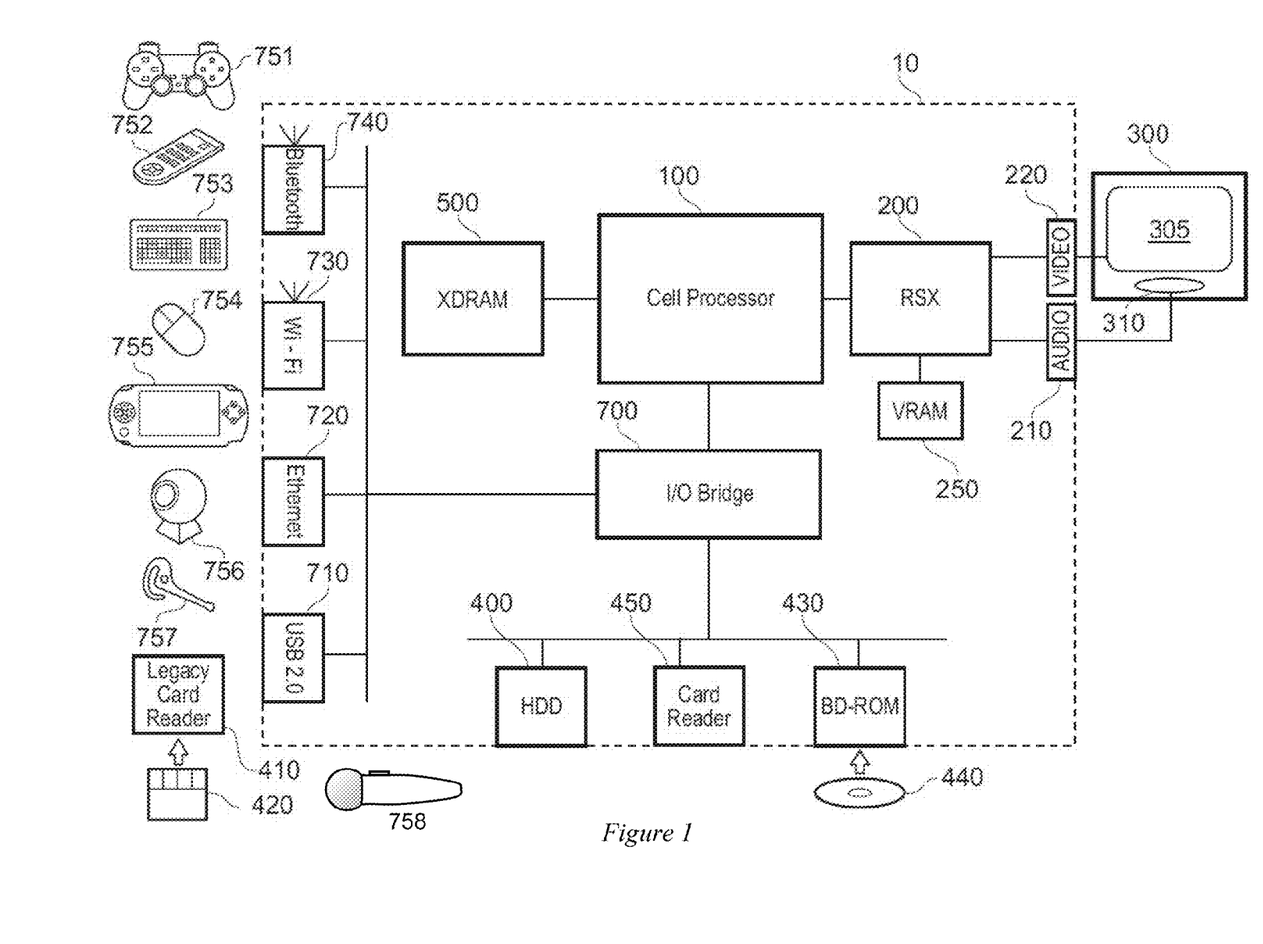
FIG. 1 is a schematic diagram of an entertainment device according to an embodiment of the present invention.

FIG. 1 schematically illustrates the overall system architecture of the Sony PS3. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections. In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity and inputs for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device or the Playstation Move (RTM) may be used as a controller. In the case of the Playstation Portable device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. Similarly in some embodiments the video camera is stereoscopic. In use, images captured by the video camera may for example be incorporated within a game or interpreted to obtain game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

In a typical configuration, the PS3 links with the display and with the EyeToy, typically with the EyeToy being placed near to and either above or below the television, facing towards the user. As a result when the images captured by the EyeToy are displayed on the television, the user is able to face themselves and see their immediate environment when they look at the screen. Typically, the Cell processor 100, the Reality Synthesiser graphics unit 200, or a combination of the two, then operate as the image augmentation means used to add one or more virtual entities in to that environment, with which the user can interact.

Figure 2A:
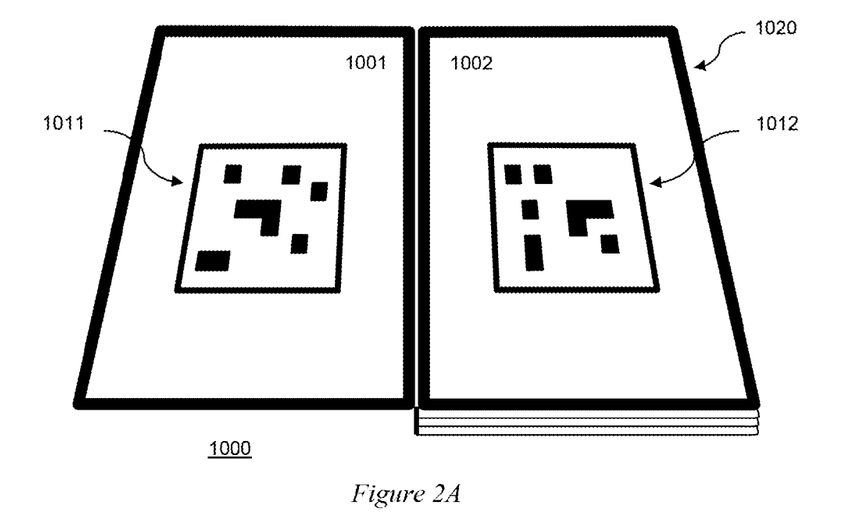
FIG. 2A is a schematic diagram of book according to an embodiment of the present invention.
Figure 2B:
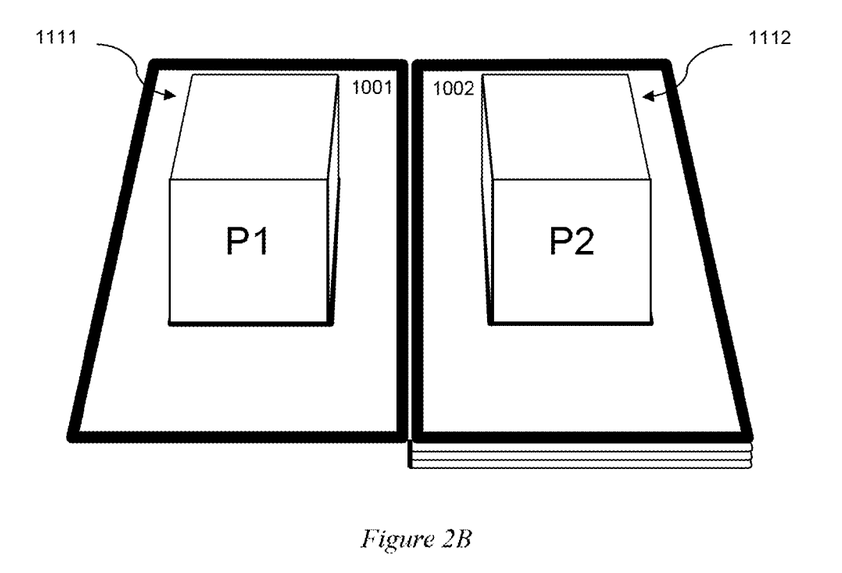
FIG. 2B is a schematic diagram of an augmented image of a book according to an embodiment of the present invention.

Referring now to FIGS. 2A and 2B, in an embodiment of the present invention, the above noted fiduciary marker is printed in a book, although it will be appreciated that this is not a limiting example.

In FIG. 2A, the book 1000 has a plurality of rigid, turnable leaves (a so-called 'board book'), and comprises fiduciary markers 1011, 1012 on each page 1001, 1002. A leaf will be understood to be a single turnable sheet or panel of a book and typically comprises a page on each side. FIGS. 2A and 2B show, by way of example, pages 1 and 2 (respectively labelled 1001 and 1002). Optionally the inside front and/or back covers of the book may also act as pages and comprise fiduciary markings. Hence in this example, page 1 may in fact be the inside front cover. Similarly, optionally the outside front and/or back covers may comprise fiduciary markings. In addition, optionally each page is edged with a high contrast marking 1020 at the outside edges to facilitate detection of the extent of the page.

When coupled to a video camera, the PS3 can capture an image of the book and use known techniques to detect the fiduciary markings on each visible page, together with their position, scale, orientation and the like, as noted previously. From these, the specific page and its apparent position, scale orientation and so forth can be similarly estimated.

Given this information, then as illustrated in FIG. 2B the PS3 can augment the captured video image of the book with virtual graphic elements 1111, 1112 corresponding to the placement, scale and orientation of the fiduciary markings 1011, 1012 on the visible pages.

The augmentation process typically comprises building a 3D model of the virtual graphic elements that have been oriented and positioned in a virtual space responsive to the orientation and position of the fiduciary markings, and projecting a view of that 3D model on to a 2D image plane consistent with the image plane of the camera. This projection forms a digital image that can then be superposed over the video image from the camera as a so-called 'augmentation layer' in order to create an augmented video image that can be output for display.

In this way the displayed version of the book becomes a 'magic' pop-up book in which the pages can come to life, under the control of the PS3.

Figure 3A:
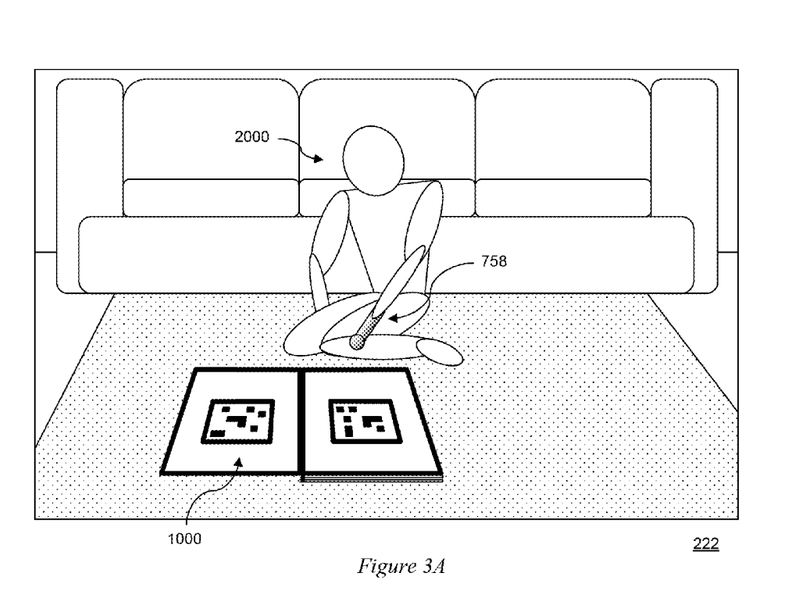
FIG. 3A is a schematic diagram of a captured video image according to an embodiment of the present invention.

Turning now to FIG. 3A, this illustrates a typical real scene that might be captured by the video camera 756, and hence represents a typical input video image that may be received by the PS3. In the image, a user 2000 is interacting with the book 1000, in this case in conjunction with a PlayStation® Move® controller 758. Background features, such as carpets/flooring, sofas, wallpaper and the like may also be present in the video image.

Figure 3B:
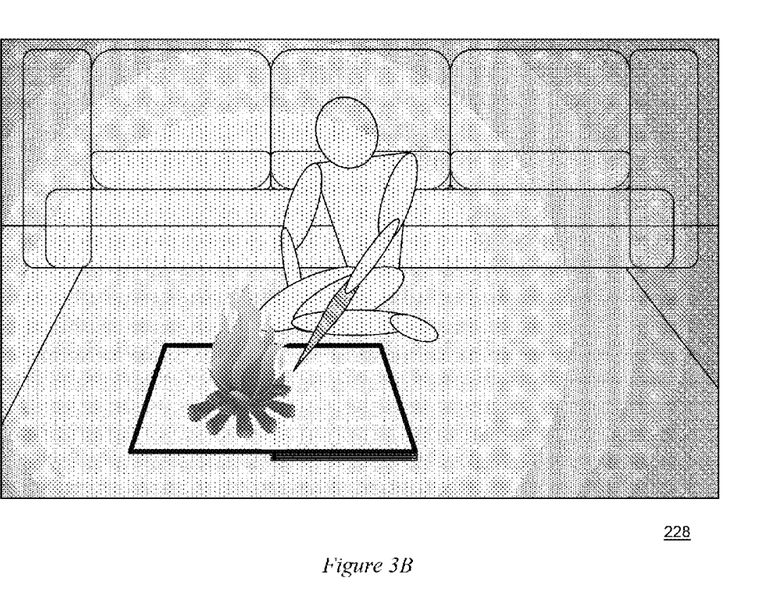
FIG. 3B is a schematic diagram of an augmented video image according to an embodiment of the present invention.

Turning now also to FIG. 3B, this illustrates a typical augmentation of the captured video image by the PS3 (e.g. by the Cell processor operating under suitable software instruction, in conjunction with the Reality Synthesiser graphics unit). In this case, the Move controller has been augmented with the image of a wand 2242, based upon the detected position and scale of the device's light in the video image, and orientation data transmitted from the device itself to the PS3 (for example based upon its accelerometer signals).

Meanwhile, in response to the displayed fiduciary markings the book has been augmented as a campsite with a campfire 2244, and the user has just pointed the wand at the campfire to ignite it.

In addition, optionally a tint has been added to the input video, modifying the colour balance in the input video responsive to metadata associated with the campfire object that indicates the colour of light that the campfire virtually generates.

Notably, in the case of conventional augmented reality it is inherent that there is a real image (i.e. the video image) to be augmented. As a result, the graphical augmentations are applied to the video image and are hence limited to the extent of the video image.

Within this augmentation, there may also be one or more local sets of co-ordinates. One set may reference the fiduciary marker, and one set may reference the Move controller. However in each case, the fiduciary marker and the Move controller will reference the image plane, as their scale, position and (in the case of the marker) orientation are variables derived from the captured image.

Hence (as a non-limiting example) the origin of the augmented reality (x, y, z) co-ordinate space may be the bottom left corner of the video image, with x, y defining positions on the image (and hence related to pixel positions) and z being determined by reference models of the fiduciary markers and/or Move controller light at a predetermined physical distance, and hence is related to a real distance from the image plane.

Meanwhile, in the case of virtual reality (e.g. a conventional game world in a video game, such as a virtual castle), this will also have its own world co-ordinate system, and this can have arbitrary units of measurement as long as the world is consistently defined. In conventional video games, users can navigate around this world by controlling a player avatar, and the current view of the castle is computed for the position of a virtual camera, based on the game world's co-ordinate system.

Figure 5:
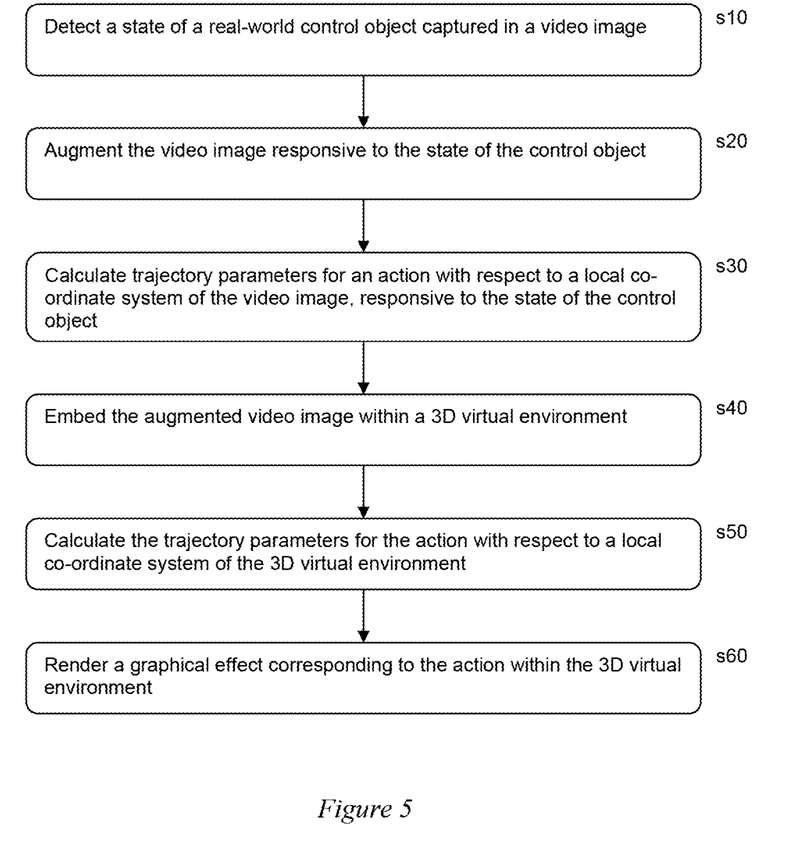
FIG. 5 is a flow diagram of a method of incorporating an augmented reality video image into a virtual environment according to an embodiment of the present invention.

Referring now to FIG. 5, in an embodiment of the present invention it is proposed to combine the two separate spaces respectively defined by the co-ordinate system of the augmented reality video image and the co-ordinate system of the virtual game world, so that users and virtual objects within the augmented reality image can interface with and project into a larger virtual world encompassing an augmented reality video image.

Hence, in an embodiment of the present invention, a position within the 3D game world is selected at which the augmented reality video will be placed, as a 2D, or planar, object. In FIG. 5, as a non-limiting example this is shown simply as being positioned parallel to a rear wall in the castle. A default scale for the object may assume that a seated user will occupy approximately ⅔ of the vertical extent of the video image and hence of the 2D object. This can be used to scale the object so that the user appears life-size within the virtual world. Alternatively, as the augmented reality system retains information regarding the actual size of the fiduciary marker (or the Move controller) reference to the effective size of the fiduciary marker or controller in the video image may be used to scale the video image, so that the fiduciary marker or controller is a predetermined size within the virtual world that is consistent with that world. In this way, if the fiduciary marker or controller is correctly re-scaled for the virtual world, the rest of the elements in the video image (including the user) will also be correctly re-scaled.

In addition, the orientation of the fiduciary marker may be used to properly align the augmented video image with the 3D game world; if it is assumed that the page upon which the fiduciary marker is printed is lying flat in the book, and the book itself is lying flat on a surface in the video image (for example on the floor), then the orientation of the fiduciary marker can be used to compute the orientation of the floor in the video image. Consequently, optionally the 2D planar object comprising the augmented video image can be further tilted and/or rotated so that the orientation (or more generally the tilt) of the fiduciary marker and hence the floor appears similar to the orientation or tilt of an associated surface in the 3D game world.

In either case, optionally a mask or other graphical effect may be used to disguise the edges of the 2D planar object, so that it looks more natural within the 3D game world. Such effects may include a graduated transparency of the object so that the edges fade away, and/or a graphical effect such as mist or a magical portal that may be applied to obscure the edges of the 2D planar object. Alternatively the 2D object may be placed behind an aperture in the 3D world, such as a window or door, which similarly serves to obscure the edges of the 2D planar object.

Once the augmented reality video image is positioned in the 3D game world, a viewpoint is then selected for the virtual camera to view the game world, which will also determine any further scaling and any rotation of the augmented reality video image as viewed within the game world, in much the same way as for any object within the game world.

In FIG. 5, the augmented reality video image has consequently been scaled to occupy approximately ⅕ of the screen area, which also makes the user approximately the right size for the castle, and is located at a position consistent with its position within the 3D game world as viewed by the virtual camera.

Hence at this point, the augmented reality video image has been inserted as a 2D planar object into the 3D virtual game world, and can be viewed as such within the 3D virtual game world. In other words, the live video from the real camera (as augmented by the augmented reality system) is embedded in a virtual 3D environment and then viewed from a virtual camera within that 3D environment.

However, whilst the augmented video image itself is a two-dimensional object, it represents a space within it (or behind it, in the sense of passing through the image plane) having a point of reference in the image plane of the real video camera.

Notably, the image plane of the augmented video image coincides with the 2D planar object now defined within the 3D game world. As a result, the image plane can act as a common reference or interface between the co-ordinate systems of the two spaces.

Figure 4:
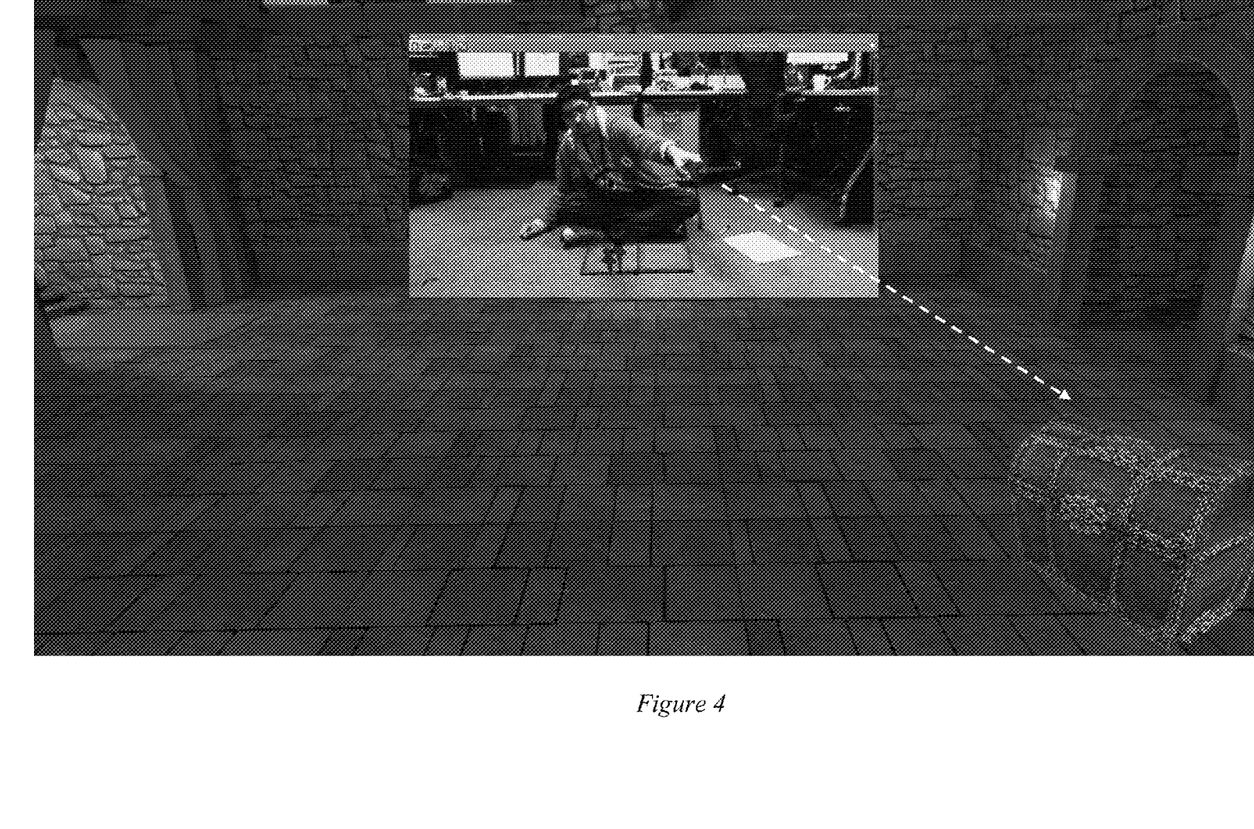
FIG. 4 is a schematic diagram of an augmented video image embedded within a 3D virtual environment according to an embodiment of the present invention.

To take a specific example, in FIGS. 3B and 4 the user is holding a wand, which may be used to point in a particular direction. The wand is an augmentation of the Move controller, and the augmented reality system can determine the position of the controller in the image plane (i.e. its x, y position in the image), the distance of the controller from the image plane (i.e. its z position, derived from the scale of the controller, or just its light, with respect to the size of the controller or light at a reference distance from the camera). Meanwhile the telemetry from the controller gives the orientation of the controller at this position. From this information, the position, size and orientation of the wand can be computed for the purposes of augmentation, but it is also possible to compute a vector projecting axially from the Move controller, and also the point of intersection by that vector with the image plane. It will also be appreciated that a similar vector and point of intersection can be computed with respect to the fiduciary marker of the book.

Assuming for the purposes of clarity that this point of intersection is within the bounds of the image, then a notional line connects the Move controller to the image plane, and if drawn, this line would look like the Move controller pointing a laser beam at the TV screen (or 2D planar object) from inside the image.

In an embodiment of the present invention, the augmented reality system can then pass to the 3D game world system a position on the image plane (and hence also a position in the 3D game world) and a vector passing through that position.

Consequently, it is possible for the 3D game world system to separately draw a vector line within its game world space that intersects with the 2D planar object at the same position, and hence appears in line with and joined to the line in the augmented reality image. This gives the illusion that the line is a single entity starting in the augmented reality space and passing into and through the virtual reality space.

Notably, the co-ordinates of the augmented reality space can also be scaled and (if necessary) rotated in a manner corresponding to the scaling and any rotation of the video image to form and place the 2D planar object. This scaling and rotation may thus be applied to the vector passed from the augmented reality world to the 3D game world.

As a result, the augmented reality system can pass vectors to any 3D game world outside the augmented reality space without requiring any information about the co-ordinate system of that 3D game world, as it is the 3D game world system that scales and rotates the vector according to how the augmented image is scaled and rotated within that 3D game world. This makes the integration of the augmented reality image, which is pre-rendered for insertion into the 3D game world, much simpler.

As noted above, a line representing the vector can thus be rendered within the augmented reality image, and this image then inserted into the 3D game world, and then using the position and vector information, a line representing the vector can be rendered in the 3D game world that matches up with the position and direction of the line in the pre-rendered augmented video image, so that the two lines appear to be a single line passing through both spaces.

It will be appreciated that in practice the graphical image need not be limited to a line. Non-limiting examples include a jet of fire or water, or any particle stream or object(s) following the (undrawn) line.

It will also be appreciated that a non-linear trajectory may similarly be derived from the position and orientation of a real-world object in the video image, and not just a straight vector. In this case the principle is the same, in that a point of intersection with the image plane is derived, and the parametric description of the trajectory is passed to the 3D game world. In this case, additionally a value indicating progress along the trajectory at the point of intersection may also be passed to the 3D game world so that this may seamlessly continue.

In addition, other variables may be passed between the augmented reality system and the 3D game system. For example, an object's velocity, and/or a parametric description of how that velocity will change, may be passed for either a straight vector or a non-linear trajectory.

Hence for example, a combination of trajectory, velocity (and optionally spin) may be used to allow a player to throw an augmented reality ball into the virtual world, where it can then hit or otherwise interact with other objects in the virtual world.

Other modifications to the augmentation of the video image may also be considered. For example, as noted previously the video image may be tinted in response to augmented features of the video image. In a similar way the video image may be tinted, or have its brightness adjusted, in response to lighting levels and colour temperatures in the virtual environment. Where the augmented reality system either operated before or independent of the 3D game world, this information for use in generating the next augmented video image may be approximated from the currently rendered image of the 3D game world.

In an alternative embodiment, the augmented reality system does not pre-render elements in the augmented reality image that are intended to pass through the image plane into the virtual game world.

Instead, the augmented reality system passes the position and orientation co-ordinate information for the real-world object (the Move controller or Fiduciary marker) to the 3D game world.

As before, this position and orientation data can be re-scaled and rotated in a manner consistent with the scaling and rotation of the video image to form the 2D planar object in the 3D game world. It can then be offset within the 3D game world in accordance with the position of the image reference point in the 2D planar object (of example the bottom left hand corner of the reference object).

The 3D game world can then treat the position and orientation data as if it is part of the 3D game world.

Now, it can draw the line or trajectory, or animate objects or particles on these lines and trajectories, from the effective source position of the line or trajectory within the 3D game world, and hence render the whole of the virtual effect within the 3D game world.

In this case, however, the 3D game system can use a modified z-buffering system to allow that part of the virtual effect that occurs behind the image plane of the augmented image to be visible in front of the augmented image, so that it can be seen to appear to emanate from the augmented image.

This embodiment has the advantage that the 3D game world's game engine may have access to better virtual effects and object models than the augmented reality system, or similarly that the game engine operates more efficiently (e.g. with a higher frame rate or less memory) without interruptions from an augmented reality system also accessing these virtual effects in a potentially uncoordinated manner.

The above embodiments allow the user to interact with objects not only within the augmented reality environment (such as for example an EyePet or a wand), but to also interact with a separate virtual environment.

Examples of this interaction are briefly outlined below.

Firstly an interaction may arise from opening the book at a particular page. This may firstly trigger the transition from just an augmented reality display on the user's TV screen to the embedding of that augmented reality display within the 3D game world (for example by initially setting the virtual camera in the 3D game world to be centred on and orthogonal to the 2D planar object, so that it looks identical to the conventional augmented image, and then pulling it back to reveal the wider 3D world). In addition turning the book to a particular page may trigger effects that transition between the augmented reality space and the 3D game world space (using either of the embodiments described above), such as having a virtual character climb out of the book and escape into the 3D game world.

Secondly, an interaction may arise from a gesture performed by the user. For example a flicking gesture using the Move controller may be interpreted as a spell casting or ball throwing action. The spell or ball may then follow a trajectory out of the augmented reality space when movement of the controller has substantially stopped, or when an action button on the controller is pressed.

Thirdly, in a manner similar to that described previously for a notional line projecting from the Move controller, the controller may be used as a pointer or cursor that can point to objects both within the augmented reality space and out into the virtual game world. A graphical effect such as a reticule or patch of light may indicate where the notional line intersects with a surface in the virtual world, or with the calculated position of a surface in the real world as captured in the video image.

In any of the above cases, to account for the possibility that the resolution of the control object in the captured video image may be quite low, and so the accuracy of the calculated trajectory (with respect to what the user may have intended) may also be quite low, the system may implement an expanding cone of interaction about the trajectory, which may be thought of as a margin of error multiplied by the virtual distance along the trajectory from the control object into the 3D game world. In this way the effective accuracy required to interact with a virtual object remains consistent independent of how far that object is from the control object in the embedded video image.

Referring now also to FIG. 5, in a summary embodiment of the present invention, a method of incorporating an augmented reality video image into a virtual environment comprises:

In a first step s10, detecting a state of a real-world control object captured in a video image (for example a real world object such as the book with the fiduciary marker, or the Move controller);

In a second step s20, augmenting the video image responsive to the state of the control object (for example, adding the campfire in response to the fiduciary marker on a particular page of the book, or overlaying the Move controller with a wand);

In a third step s30, calculating trajectory parameters for an action with respect to a local co-ordinate system of the video image, responsive to the state of the control object (for example, if the user presses an action button on the Move controller, or performs a triggering gesture as described previously, then a straight or curved line is projected from the controller based upon its position with respect to the video image plane and the orientation information transmitted to the PS3).

In a fourth step s40, embedding the augmented video image within a 3D virtual environment (i.e. as a 2D planar object, positioned within the 3D virtual environment and hence having position co-ordinates with respect to a local co-ordinate system of the 3D virtual environment);

In a fifth step s50, calculating the trajectory parameters for the action with respect to the local co-ordinate system of the 3D virtual environment (either for that part of the trajectory passing out of the image plane and hence out of the 2D planar object, or for the whole trajectory, as described previously); and In a sixth step s60, rendering a graphical effect corresponding to the action within the 3D virtual environment (again as described above, either for the part emanating from the 2D planar object, or treating the space within the real environment as part of the 3D environment overlaid on that 3D environment behind the 2D planar object).

As noted previously, the graphical effect can either be rendered partly in the augmented video image and partly in the 3D environment, or wholly within the 3D environment.

Hence in an instance of the summary embodiment, the method comprises the steps of calculating for the trajectory a point of intersection with the image plane of the video image; and calculating the corresponding point within the 3D virtual environment in which the augmented video image is embedded (i.e. the corresponding point on the 2D planar object, using the co-ordinate system of the 3D virtual environment); and step s20 comprises augmenting the video image with a graphical effect corresponding to the action (i.e. up to the point of intersection with the image plane), and step s60 comprises rendering the graphical effect with an start-point at the calculated corresponding point within the 3D virtual environment (i.e. from the corresponding point on the 2D planar object)—here it will be understood that the 'start point' does not imply (or rule out) a temporal aspect to the graphical effect, or that the graphical effect must re-start at this point (e.g. a widening cone of light, as in a torch effect, may have partially widened at the point of intersection, and so the effect starts at this partially widened state in the virtual environment at the corresponding point on the 2D planar object).

Hence also in an alternative instance of the summary embodiment, the method comprises the steps of calculating the position and orientation of the real-world control object with respect to the local co-ordinate system of the video image (e.g. x and y pixels within the image, and z as a multiple of a reference distance based upon the relative size of the control object to the reference size of the control object at a reference distance), and mapping the calculated position and orientation of the real-world control object to the local co-ordinate system of the 3D virtual environment, responsive to the position and orientation of the augmented video image embedded within the 3D virtual environment. As noted previously, re-scaling, re-positioning and if necessary rotating the co-ordinates for the control object in response to the scale, position and orientation of the 2D planar object in the 3D game world enables these co-ordinates to either be directly used in, or mapped directly over to, the local co-ordinate system of the 3D game world. Once done, step s60 comprises rendering the graphical effect with a start-point at the start of the calculated trajectory. In other words, at the point where the effect emanates from the control object (or from a point consistent with an augmentation of the control object, such as the tip of a wand that is augmenting the controller, or an augmented top hat sitting on the book).

In an instance of the summary embodiment, step 60 also comprises modifying a depth buffer to display the graphical effect when the augmented video image is positioned between the start of the calculated trajectory and the rendering viewpoint. In other words, because the control object has depth with respect to the image plane, the graphical effect is likely to start behind the 2D planar object, and conventionally a z-buffer would therefore not show that part of the graphical effect having a depth greater than that of the 2D planar object.

Hence for example the z-buffer may have a flag or override for such graphical effects (and/or for the 2D planar object) so that they are shown despite being behind the 2D planar object depicting the augmented video. Other effects such as anti-aliasing can also be applied based on this rendering order.

In an instance of the summary embodiment, then as noted previously, the trajectory can either be a simple linear vector, or a parametrically defined non-linear path. Alternatively or in addition, the trajectory could be a procedurally defined path, a such as one generated by a flocking algorithm.

In an instance of the summary embodiment, s40 comprises scaling the video image responsive to the size of the control object within the captured video image (e.g. as noted above, with reference to the known size of the fiduciary marker; hence for example if the real-world marker is 10 cm×10 cm, the video image is rescaled so that the real-world marker appears to 10 cm×10 cm with respect to other virtual objects in the 3D game world.

In an instance of the summary embodiment, s40 comprises applying a graphical effect to the augmented video image that obscures the edges of the augmented video image.

In an instance of the summary embodiment, the method comprises the step of modifying the colour balance of the video image in response to one or both of the colour temperature of a virtual object used in the augmentation of the video image (e.g. derived from meta data associated with that object), and the colour temperature of the 3D virtual environment (for example an average based upon a subsampling of the current rendered image).

In an instance of the summary embodiment, the method comprises the step of modifying the brightness of the video image in response to one or both of a predefined brightness of a virtual object used in the augmentation of the video image (again for example as set by metadata), and a brightness value for the 3D virtual environment (again for example based upon a subsampling of the current rendered image).

As noted previously, the PS3 is a suitable entertainment device for implementing the above disclosed techniques and methods when operating under suitable software instruction.

Hence for example, the USB port 710 may act as an input operable to receive a captured video image depicting a real-world control object. Meanwhile, the Cell processor 100 may act as a first image analyser operable to detect a state of the real-world control object in the video image. Similarly the Reality Synthesiser (RSX) 200 may act as a first image processor operable to augment the video image responsive to the state of the control object. The Cell processor may also act as a first trajectory processor operable to calculate trajectory parameters for an action with respect to a local co-ordinate system of the video image, responsive to the state of the control object. The Reality Synthesiser 200 may also act as a second image processor operable to embed the augmented video image within a 3D virtual environment. Again, the cell processor may act as a second trajectory processor operable to calculate the trajectory parameters for the action with respect to a local co-ordinate system of the 3D virtual environment, and finally the RSX may also act as a second image processor operable to render a graphical effect corresponding to the action within the 3D virtual environment.

The various roles of the Cell processor may be divided between individual processors of the cell processor, or may be shared as processing threads.

Consequently, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or in the form of a transmission via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

We claim:

1. A method of incorporating an augmented reality video image into a virtual environment, comprising:
  detecting, by a first image analyser, a state of a real-world control object captured in a video image, the real-world control object being a physical object configured to be pointed in a certain direction by a user;

augmenting, by one or more image processors, the video image responsive to the state of the real-world control object;

calculating, by one or more trajectory processors, trajectory parameters for an action with respect to a local co-ordinate system of the augmented video image, responsive to the state of the real-world control object, the trajectory parameters for the action relating to a pointing direction of the real-world control object;

embedding, by the one or more image processors, the augmented video image within a 3D virtual environment;

calculating, by the one or more trajectory processors, the trajectory parameters for the action with respect to a local co-ordinate system of the 3D virtual environment; and rendering, by the one or more image processors, a graphical effect corresponding to the action within the 3D virtual environment, the rendered graphical effect being adapted for presentation on a display device to the user.

2. A method according to claim 1, comprising the steps of:
calculating, according to the trajectory parameters, a point of intersection with an image plane of the video image; and
calculating a corresponding point within the 3D virtual environment in which the augmented video image is embedded;
and in which:
the step of augmenting the video image responsive to the state of the real-world control object comprises augmenting the video image with the graphical effect corresponding to the action; and
the step of rendering the graphical effect corresponding to the action within the 3D virtual environment comprises rendering the graphical effect with a start-point at the calculated corresponding point within the 3D virtual environment.

3. A method according to claim 1, comprising the steps of:
calculating a position and orientation of the real-world control object with respect to the local co-ordinate system of the video image; and
mapping the calculated position and orientation of the real-world control object to the local co-ordinate system of the 3D virtual environment, responsive to a position and orientation of the augmented video image embedded within the 3D virtual environment;
and in which:
the step of rendering the graphical effect corresponding to the action within the 3D virtual environment comprises rendering the graphical effect with a start-point at the start of the calculated trajectory.

4. A method according to claim 3, in which the step of rendering the graphical effect corresponding to the action within the 3D virtual environment comprises modifying a depth buffer to allow display of the graphical effect when the augmented video image is positioned between the start of the calculated trajectory and the rendering viewpoint.

5. A method according to claim 1, in which the calculated trajectory is one or more selected from the list consisting of:
i. a linear vector;
ii. a parametrically defined non-linear path; and
iii. a procedurally defined non-linear path.

6. A method according to claim 1, in which the step of embedding the augmented video image within the 3D virtual environment comprises scaling the augmented video image responsive to the size of the control object within the captured video image.

7. A method according to claim 1 in which the step of embedding the augmented video image within the 3D virtual environment comprises applying a graphical effect to the augmented video image that obscures the edges of the augmented video image.

8. A method according to claim 1, comprising the step of modifying a colour balance of the video image in response to one or more selected from the list consisting of:
i. a colour temperature of a virtual object used in the augmentation of the video image; and
ii. a colour temperature of the 3D virtual environment.

9. A method according to claim 1, comprising the step of modifying a brightness of the video image in response to one or more selected from the list consisting of:
i. a predefined brightness of a virtual object used in the augmentation of the video image; and
ii. a brightness value for the 3D virtual environment.

10. A non-transitory computer program product comprising computer program instructions that when performed by one or more processors implement a method comprising the steps of:
detecting a state of a real-world control object captured in a video image, the real-world control object being a physical object configured to be pointed in a certain direction by a user;
augmenting the video image responsive to the state of the real-world control object;
calculating trajectory parameters for an action with respect to a local co-ordinate system of the augmented video image, responsive to the state of the real-world control object, the trajectory parameters for the action relating to a pointing direction of the real-world control object;
embedding the augmented video image within a 3D virtual environment;
calculating the trajectory parameters for the action with respect to a local co-ordinate system of the 3D virtual environment; and
rendering a graphical effect corresponding to the action within the 3D virtual environment, the rendered graphical effect being adapted for presentation on a display device to the user.

11. An entertainment device, comprising
an input configured to receive a captured video image depicting a real-world control object;
a first image analyser configured to detect a state of the real-world control object in the video image, the real-world control object being a physical object configured to be pointed in a certain direction by a user;
one or more image processors configured to augment the video image responsive to the state of the control object;
one or more trajectory processors configured to calculate trajectory parameters for an action with respect to a local co-ordinate system of the augmented video image, responsive to the state of the control object, the trajectory parameters for the action relating to a pointing direction of the real-world control object;
the one or more image processors configured to embed the augmented video image within a 3D virtual environment;
the one or more trajectory processors configured to calculate the trajectory parameters for the action with respect to a local co-ordinate system of the 3D virtual environment; and
the one or more image processors configured to render a graphical effect corresponding to the action within the 3D virtual environment, the rendered graphical effect being adapted for presentation on a display device to the user.

12. An entertainment device according to claim 11, in which:

the one or more trajectory processors are configured to calculate, according to the trajectory parameters, a point of intersection with an image plane of the video image; and the one or more trajectory processors are configured to calculate a corresponding point within the 3D virtual environment in which the augmented video image is embedded;

the one or more image processors are configured to augment the video image with the graphical effect corresponding to the action; and the one or more image processors are configured to render the graphical effect with a start-point at the calculated corresponding point within the 3D virtual environment.

13. An entertainment device according to claim 11, in which:

the one or more trajectory processors are configured to calculate a position and orientation of the real-world control object with respect to the local co-ordinate system of the video image; and the one or more trajectory processors are configured to map the calculated position and orientation of the real-world control object to the local co-ordinate system of the 3D virtual environment, responsive to a position and orientation of the augmented video image embedded within the 3D virtual environment;

and in which:

the one or more image processors are configured to render the graphical effect with a start-point at the start of the calculated trajectory.

14. An entertainment device according to claim 13, comprising a depth buffer arranged to allow display of the graphical effect when the augmented video image is positioned between the start of the calculated trajectory and the rendering viewpoint.

15. An entertainment device according to claim 11, in which the one or more image processors are configured to scale the augmented video image responsive to the size of the control object within the captured video image when embedding the augmented video image within the 3D virtual environment.

* * * * *